(12) United States Patent
Katoh

(10) Patent No.: US 7,602,210 B2
(45) Date of Patent: Oct. 13, 2009

(54) TWO-WIRE TRANSMITTER

(75) Inventor: Dai Katoh, Musashino (JP)

(73) Assignee: Yokogawa Electric Corporation, Musashino-Shi, Tokyo (JP)

( * ) Notice: Subject to any disclaimer, the term of this patent is extended or adjusted under 35 U.S.C. 154(b) by 3 days.

(21) Appl. No.: 12/080,033

(22) Filed: Mar. 31, 2008

(65) Prior Publication Data

US 2008/0297198 A1 Dec. 4, 2008

(30) Foreign Application Priority Data

Mar. 29, 2007 (JP) ............................... 2007-086431

(51) Int. Cl.
*H03K 17/16* (2006.01)
*H03K 19/003* (2006.01)

(52) U.S. Cl. .............................. 326/33; 326/62; 326/32; 326/82

(58) Field of Classification Search .................. None
See application file for complete search history.

(56) References Cited

U.S. PATENT DOCUMENTS

2007/0071082 A1* 3/2007 Rauer et al. .................. 375/224

FOREIGN PATENT DOCUMENTS

JP 3090001 7/2000

* cited by examiner

*Primary Examiner*—Anh Q Tran
(74) *Attorney, Agent, or Firm*—Nutter McClennen & Fish LLP; John J. Penny, Jr.

(57) ABSTRACT

A two-wire transmitter for receiving power supply from an external circuit through two transmission lines and also transmitting a current signal based on the measurement value of a sensor includes a current control section to which a voltage is supplied from an external circuit, for controlling the current value of the current signal based on an electric signal responsive to the measurement value of the sensor, if current consumption of the two-wire transmitter becomes smaller than the current value of the current signal, the current control section for charging and if the current consumption becomes larger than the current value of the current signal, the current control section for discharging; a computation control section for outputting the electric signal to the current control section and also outputting a setting signal based on predetermined computation processing information; a clock supply circuit for controlling the frequency of a clock signal based on the setting signal and supplying the clock signal to the computation control section; and a constant-voltage circuit for setting output voltage of the current control section to a predetermined voltage and supplying the voltage at least to the computation control section and the clock supply circuit.

11 Claims, 5 Drawing Sheets

TWO-WIRE TRANSMITTER

This application claims priority to Japanese Patent Application No. 2007-086431, filed Mar. 29, 2007, in the Japanese Patent Office. The priority application is incorporated by reference in its entirety.

TECHNICAL FIELD

The present disclosure relates to a two-wire transmitter for receiving power supply from an external circuit through two transmission lines and also transmitting a current signal based on the measurement value of a sensor and in particular to a two-wire transmitter capable of operating if the maximum current consumption temporarily exceeds output current.

RELATED ART

Generally, the two-wire transmitter receives power supply from an external circuit through two transmission lines and also transmitting a current signal of 4 to 20 mA. The consumption current of the two-wire transmitter is designed so as not to exceed the current signal.

The following is a prior art document relevant to such a two-wire transmitter for receiving power supply from an external circuit through two transmission lines and also transmitting a current signal based on the measurement value of a sensor:

[Patent document 1] Japanese Patent No. 3090001

FIG. 5 is a block diagram to show an example of a two-wire transmitter in a related art. In FIG. 5, numeral 1 denotes a current control circuit, numeral 2 denotes a Zener diode, numeral 3 denotes a computation control section made up of a microprocessor, memory, and an interface circuit, numeral 4 denotes a clock supply circuit, numeral 5 denotes internal circuitry made up of miscellaneous circuits, etc., provided in the two-wire transmitter in the related art, and numeral 6 denotes a detection resistor.

The current control circuit 1, the Zener diode 2, and the detection resistor 6 make up a current control section 50, and the current control section 50, the computation control section 3, the clock supply circuit 4, and the internal circuitry 5 make up a two-wire transmitter 100.

An external circuit indicated by EC100 in FIG. 5 is connected to terminals indicated by TM100 and TM101 of the two-wire transmitter 100 in FIG. 5 through transmission lines indicated by LP100 and LP101 in FIG. 5.

A power unit indicated by EP100 in FIG. 5 provided in the external circuit indicated by EC100 in FIG. 5 is connected to one end of the current control circuit 1 and one end of the detection resistor 6 through the terminals indicated by TM100 and TM101 in FIG. 5.

An opposite end of the current control circuit 1 is connected to a cathode of the Zener diode 2, an input terminal of the computation control section 3, an input terminal of the clock supply circuit 4, one end of the internal circuitry 5, and one end of the detection resistor 6.

An anode of the Zener diode 2, an opposite end of the computation control section 3, an opposite end of the clock supply circuit 4, an opposite end of the internal circuitry 5, and an opposite end of the detection resistor 6 are connected.

A clock signal of the clock supply circuit 4 indicated by CL100 in FIG. 5 is input to a clock input terminal of the computation control section 3. An electric signal of the computation control section 3 indicated by ES100 in FIG. 5 is input to an input terminal of the current control circuit 1.

The operation concerning power supply in the related art example shown in FIG. 5 is as follows: To begin with, the power unit indicated by EP100 in FIG. 5 supplies a voltage to the current control circuit 1 through the terminals indicated by TM100 and TM101 in FIG. 5.

A current is output from the current control circuit 1 and is applied to the Zener diode 2, the computation control section 3, the clock supply circuit 4, and the internal circuitry 5.

The clock supply circuit 4 supplies a clock signal to the computation control section 3. For example, the clock supply circuit 4 supplies a clock signal indicated by CL100 in FIG. 5 to the computation control section 3.

On the other hand, although not shown in the figure, a sensor (not shown) measures physical quantities (for example, temperature, humidity, etc.,) and outputs them to the computation control section 3.

The computation control section 3 outputs an electric signal indicated by ES100 in FIG. 5 to the current control circuit 1 based on the measurement value of the sensor.

The current control circuit 1 controls the current value (for example, 4 mA) of a current signal indicated by Io in FIG. 5 (hereinafter, output current) based on the electric signal indicated by ES100 in FIG. 5, and also outputs a current to the Zener diode 2, the computation control section 3, the clock supply circuit 4, and the internal circuitry 5.

If current consumption of the two-wire transmitter 100 indicated by IL100 in FIG. 5 becomes smaller than the output current indicated by Io in FIG. 5 and a surplus current occurs, the surplus current is shunted through the Zener diode 2.

Although not shown in the figure, voltage Va proportional to the current flowing into the transmission lines indicated by LP100 and LP101 in FIG. 5 occurs in the detection resistor 6.

The current control circuit 1 detects the voltage Va of the detection resistor 6 and also controls the output current so that the output current becomes a current value responsive to the electric signal indicated by ES100 in FIG. 5 based on the voltage Va.

Thus, the current control circuit 1 controls the current value of the output current based on the voltage Va of the detection resistor 6, whereby it is made possible to control the current value of the output current to the current value responsive to the electric signal indicated by ES100 in FIG. 5.

Consequently, the computation control section 3 outputs an electric signal responsive to the measurement value of the sensor, the current control circuit controls the current value of the output current so that the current value becomes the current value responsive to the electric signal, and if current consumption becomes smaller than the output current, the surplus current is shunted through the Zener diode, whereby it is made possible to receive power supply from the external circuit through the two transmission lines and also transmit a current signal of 4 to 20 mA.

The computation control section 3 of the two-wire transmitter in the related art has a characteristic of determining current consumption according to the frequency of the clock signal supplied from the clock supply circuit 4.

Further, the computation control section 3 previously finds processing information concerning the computation processing amount and time period, such as a time period over which a high processing capability is required and the computation processing amount is large in complicated computation processing, etc., or a time period over which complicated computation processing is not performed and the computation processing amount is small, which will be hereinafter referred to as computation processing information.

The computation control section 3 performs computation processing, etc., based on software operated in accordance with such previously found computation processing information.

Thus, the computation control section 3 outputs a setting signal (not shown) to the clock supply circuit 4 for controlling the frequency of the clock signal based on the previously found computation processing information, whereby it is made possible to decrease the average current consumption of the two-wire transmitter.

For example, the computation control section 3 outputs a setting signal to the clock supply circuit 4 in a time period over which the computation processing amount of the computation control section 3 is small based on the previously found computation processing information.

The clock supply circuit 4 outputs a low-frequency clock signal to the computation control section 3 based on the setting signal.

In this case, the low-frequency clock signal is supplied to the computation control section 3 from the clock supply circuit 4, whereby the current consumed by the computation control section 3 lessens and the whole current consumption the two-wire transmitter also decreases.

Thus, the computation control section 3 outputs the setting signal to the clock supply circuit 4 based on the previously found computation processing information and the clock supply circuit 4 controls the frequency of the clock signal based on the setting signal and outputs the clock signal to the computation control section 3, whereby the average current consumption of the two-wire transmitter decreases.

However, the related art example shown in FIG. 5, etc., is designed so that the current consumption of the two-wire transmitter is always within the current signal and thus the power supply circuit of the two-wire transmitter is designed with the maximum current consumption as the reference.

Thus, the two-wire transmitter in the related art involves a restriction such that the current consumption must be suppressed to less than the minimum predetermined value, and the output current is output based on the maximum current consumption rather than the average current consumption and therefore the decrease effect of the average current consumption by controlling the clock signal cannot effectively be utilized; this is a problem.

SUMMARY

Exemplary embodiments of the present invention provide a two-wire transmitter capable of operating if the maximum current consumption temporarily exceeds output current.

To the end, according to a first aspect of the invention, there is provided a two-wire transmitter for receiving power supply from an external circuit through two transmission lines and also transmitting a current signal based on the measurement value of a sensor, the two-wire transmitter including a current control section to which a voltage is supplied from an external circuit, for controlling the current value of the current signal based on an electric signal responsive to the measurement value of the sensor, if current consumption of the two-wire transmitter becomes smaller than the current value of the current signal, the current control section for charging and if the current consumption becomes larger than the current value of the current signal, the current control section for discharging; a computation control section for outputting the electric signal to the current control section and also outputting a setting signal based on predetermined computation processing information; a clock supply circuit for controlling the frequency of a clock signal based on the setting signal and supplying the clock signal to the computation control section; and a constant-voltage circuit for setting output voltage of the current control section to a predetermined voltage and supplying the voltage at least to the computation control section and the clock supply circuit, whereby it is made possible for the two-wire transmitter to operate if the maximum current consumption temporarily exceeds the output current.

According to a second aspect of the invention, there is provided a two-wire transmitter for receiving power supply from an external circuit through two transmission lines and also transmitting a current signal based on the measurement value of a sensor, the two-wire transmitter including a current control section to which a voltage is supplied from an external circuit, for controlling the current value of the current signal based on an electric signal responsive to the measurement value of the sensor, if current consumption of the two-wire transmitter becomes smaller than the current value of the current signal, the current control section for charging and if the current consumption becomes larger than the current value of the current signal, the current control section for discharging; a voltage detection section for outputting an interrupt signal if output voltage of the current control section reaches a preset comparison voltage; a computation control section for outputting the electric signal to the current control section and also outputting a setting signal based on predetermined computation processing information, if the interrupt signal is input, the computation control section for stopping outputting the setting signal; a clock supply circuit for controlling the frequency of a clock signal based on the setting signal and supplying the clock signal to the computation control section; and a constant-voltage circuit for setting output voltage of the current control section to a predetermined voltage and supplying the voltage at least to the computation control section and the clock supply circuit, whereby it is made possible for the two-wire transmitter to operate if the maximum current consumption temporarily exceeds the output current.

According to a third aspect of the invention, there is provided a two-wire transmitter for receiving power supply from an external circuit through two transmission lines and also transmitting a current signal based on the measurement value of a sensor, the two-wire transmitter including a current control section to which a voltage is supplied from an external circuit, for controlling the current value of the current signal based on an electric signal responsive to the measurement value of the sensor, if current consumption of the two-wire transmitter becomes smaller than the current value of the current signal, the current control section for charging and if the current consumption becomes larger than the current value of the current signal, the current control section for discharging; a voltage detection section for outputting an interrupt signal if output voltage of the current control section reaches a preset comparison voltage; a computation control section for outputting the electric signal to the current control section and also outputting a setting signal based on predetermined computation processing information; a clock supply circuit for controlling the frequency of a clock signal based on the setting signal and supplying the clock signal to the computation control section, if the interrupt signal is input, the clock supply circuit for lowering the frequency of the clock signal; and a constant-voltage circuit for setting output voltage of the current control section to a predetermined voltage and supplying the voltage at least to the computation control section and the clock supply circuit, whereby it is made possible for the two-wire transmitter to operate if the maximum current consumption temporarily exceeds the output current.

The invention according to a fourth aspect is as follows:

In the two-wire transmitter according to any of the first to third aspects of the invention, the current control section is made up of a detection resistor having one end connected to a power unit of the external circuit through the transmission line and an opposite end grounded for converting the current signal into a voltage; a current control circuit for controlling the current value of the current signal based on the voltage detected by the detection resistor and the electric signal; a capacitor having one end connected to the current control circuit and an opposite end grounded, if the current consumption becomes smaller than the current value of the current signal, the capacitor being charged and if the current consumption becomes larger than the current value of the current signal, the capacitor being discharged; and a Zener diode having one end connected to the current control circuit and an opposite end grounded for clamping voltage of the capacitor to a preset voltage, whereby it is made possible for the two-wire transmitter to operate if the maximum current consumption temporarily exceeds the output current.

The invention according a fifth aspect is as follows:

In the two-wire transmitter according to any of the first to third aspects of the invention, the computation control section stops the operation based on the predetermined computation processing information, whereby it is made possible for the two-wire transmitter to operate if the maximum current consumption temporarily exceeds the output current.

The invention according to a sixth aspect is as follows:

In the two-wire transmitter according to the second or third aspect of the invention, the voltage detection section is implemented as a comparator for outputting the interrupt signal if the output voltage of the current control section reaches the comparison voltage, whereby it is made possible for the two-wire transmitter to operate if the maximum current consumption temporarily exceeds the output current.

The invention according to a seventh aspect is as follows:

In the two-wire transmitter according to the second or third aspect of the invention, the voltage detection section makes a comparison between the output voltage of the current control section and a first comparison voltage and between the output voltage and a second comparison voltage and outputs the interrupt signal to the computation control section or the clock supply circuit based on the comparison result, whereby it is made possible for the two-wire transmitter to operate if the maximum current consumption temporarily exceeds the output current.

The invention according to an eighth aspect is as follows:

In the two-wire transmitter according to the seventh aspect of the invention, the voltage detection section is implemented as a comparator having hysteresis for outputting the interrupt signal until the output voltage of the current control section is restored to the second comparison voltage if the output voltage of the current control section reaches the first comparison voltage, whereby it is made possible for the two-wire transmitter to operate if the maximum current consumption temporarily exceeds the output current.

The invention provides the following advantages:

According to the first, fourth or fifth aspect of the invention, the current control section controls the current value of the current signal based on the electric signal responsive to the measurement value of the sensor, if the current consumption becomes smaller than the current value of the current signal, charging is performed and if the current consumption becomes larger than the current value of the current signal, discharging is performed. The constant-voltage circuit sets the output voltage of the current control section to the predetermined voltage, the computation control section outputs the setting signal based on the predetermined computation processing information, and the clock supply circuit controls the frequency of the clock signal based on the setting signal and outputs the clock signal, whereby it is made possible for the two-wire transmitter to operate if the maximum current consumption temporarily exceeds the output current.

According to the second, third, fourth, fifth or sixth of the invention, if the output voltage of the current control section becomes smaller than the comparison voltage, the current control section outputs the interrupt signal to the computation control section and the clock supply circuit for lowering the frequency of the clock signal, whereby overdischarge of the current control section is detected, the state is recovered to the normal state, and it is made possible for the two-wire transmitter to operate if the maximum current consumption temporarily exceeds the output current.

According to the second, third, fourth, fifth, sixth, seventh or eighth of the invention, if the output voltage of the current control section becomes smaller than the first comparison voltage, the current control section outputs the interrupt signal to the computation control section and the clock supply circuit until the output voltage of the current control section becomes larger than the second comparison voltage for lowering the frequency of the clock signal, whereby overdischarge of the current control section is detected, the state is recovered to the normal state, and it is made possible for the two-wire transmitter to operate if the maximum current consumption temporarily exceeds the output current.

Other features and advantages may be apparent from the following detailed description, the accompanying drawings and the claims.

DETAILED DESCRIPTION

Figure 1:
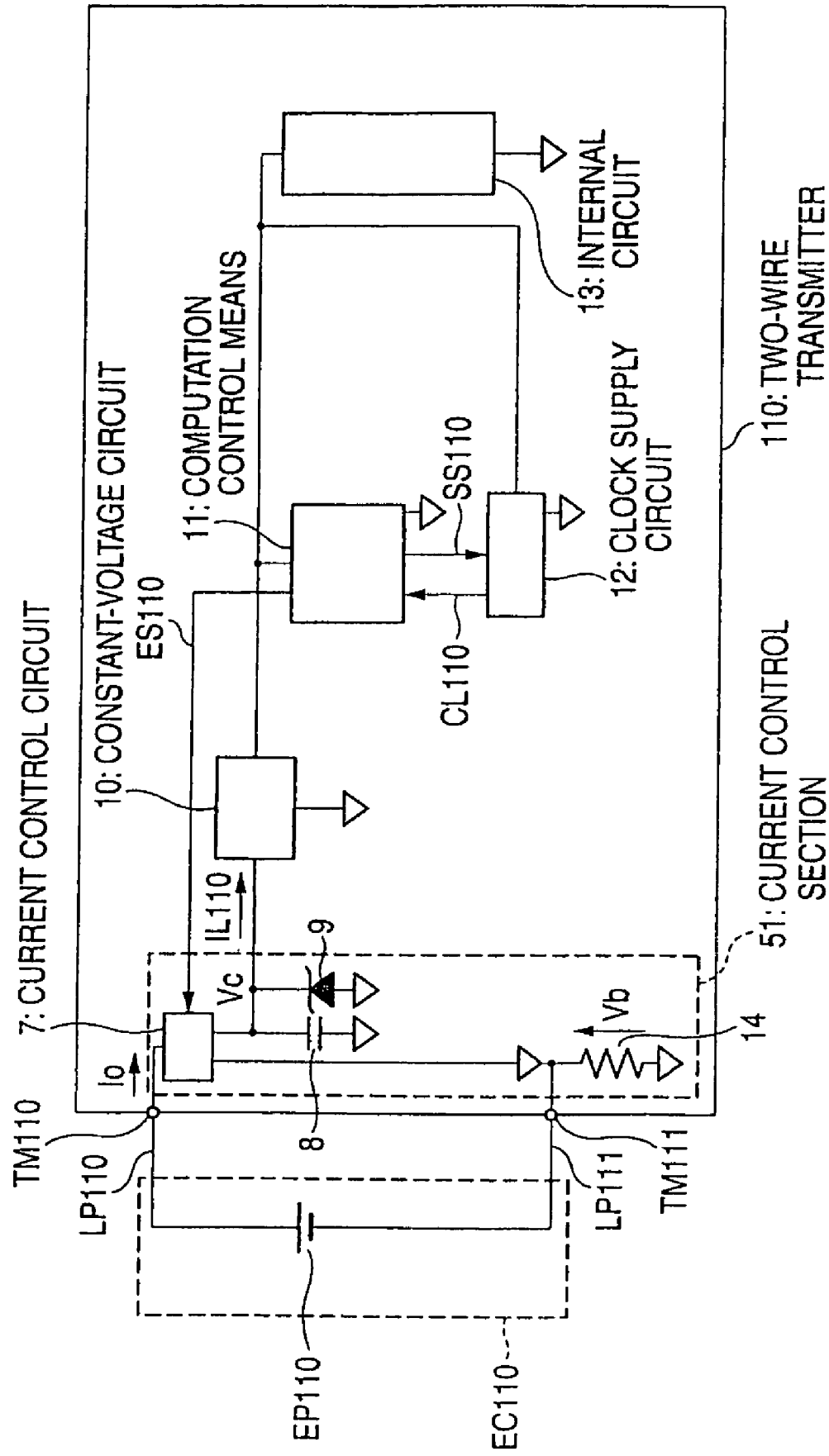
FIG. 1 is a block diagram to show an embodiment of a two-wire transmitter according to the invention.

The invention will be discussed in detail with reference to the accompanying drawings. FIG. 1 is a block diagram to show an embodiment of a two-wire transmitter according to the invention.

In FIG. 1, numeral 7 denotes a current control circuit, numeral 8 denotes a capacitor, numeral 9 denotes a Zener diode, numeral 10 denotes a constant-voltage circuit, numeral 11 denotes a computation control section made up of a microprocessor, memory, an interface circuit, etc., numeral 12 denotes a clock supply circuit, numeral 13 denotes internal circuitry made up of miscellaneous circuits, etc., provided in a two-wire transmitter, and numeral 14 denotes a detection resistor.

The current control circuit 7, the capacitor 8, the Zener diode 9, and the detection resistor 14 make up a current control section 51, and the current control section 51, the constant-voltage circuit 10, the computation control section 11, the clock supply circuit 12, and the internal circuitry 13 make up a two-wire transmitter 110.

An external circuit indicated by EC110 in FIG. 1 is connected to terminals indicated by TM110 and TM111 of the two-wire transmitter 110 in FIG. 1 through transmission lines indicated by LP110 and LP111 in FIG. 1.

A power unit indicated by EP110 in FIG. 1 provided in the external circuit indicated by EC110 in FIG. 1 is connected to one end of the current control circuit 7 and one end of the detection resistor 14 through the terminals indicated by TM110 and TM111 in FIG. 1.

An opposite end of the current control circuit 7 is connected to one end of the capacitor 8, a cathode of the Zener diode 9, and one end of the constant-voltage circuit 10.

An opposite end of the constant-voltage circuit 10 is connected to a power input terminal of the computation control section 11, a power input terminal of the clock supply circuit 12, and a power input terminal of the internal circuitry 13.

An opposite end of the capacitor 8, an anode of the Zener diode 9, an opposite end of the constant-voltage circuit 10, an opposite end of the computation control section 11, an opposite end of the clock supply circuit 12, an opposite end of the internal circuitry 13, and an opposite end of the detection resistor 14 are grounded.

A setting signal of the computation control section 11 indicated by SS110 in FIG. 1 is input to a control terminal of the clock supply circuit 12 and an electric signal of the computation control section 11 indicated by ES110 in FIG. 1 is input to a control terminal of the current control circuit 7.

A clock signal output by the clock supply circuit 12 indicated by CL110 in FIG. 1 is input to a clock input terminal of the computation control section 11.

The operation concerning power supply of one embodiment of the two-wire transmitter according to the invention shown in FIG. 1 is as follows:

To begin with, the power unit indicated by EP110 in FIG. 1 supplies a voltage to the current control circuit 7 through the terminals indicated by TM110 and TM111 in FIG. 1.

The current control circuit 7 outputs a current to the capacitor 8, the Zener diode 9, and the constant-voltage circuit 10.

The constant-voltage circuit 10 sets the output voltage of the current control section 51 to a predetermined voltage and also supplies the voltage to the computation control section 11, the clock supply circuit 12, and the internal circuitry 13.

On the other hand, although not shown in the figure, a sensor (not shown) measures physical quantities (for example, temperature, humidity, etc.,) and outputs them to the computation control section 11.

The computation control section 11 outputs an electric signal indicated by ES110 in FIG. 1 to the current control circuit 7 based on the measurement value of the sensor.

The current control circuit 7 controls the current value (for example, 4 mA) of a current signal indicated by Io in FIG. 1 (hereinafter, output current) based on the electric signal indicated by ES110 in FIG. 1, and also outputs a current to the capacitor 8, the Zener diode 9, and the constant-voltage circuit 10.

If current consumption of the two-wire transmitter 110 indicated by IL110 in FIG. 1 becomes smaller than the output current indicated by Io in FIG. 1 and a surplus current occurs, the surplus current flows from the current control circuit 7 into the capacitor 8, which then is charged.

Letting the output voltage of the current control section 51 be voltage "Vc," the voltage "Vc" increases as the capacitor 8 is charged.

The voltage "Vc" is clamped to Zener voltage Vz preset by the Zener diode 9. That is, the voltage "Vc" does not become higher than the Zener voltage Vz.

Voltage Vb proportional to the current flowing into the transmission lines indicated by LP110 and LP111 in FIG. 1 occurs in the detection resistor 14 as shown in FIG. 1.

The current control circuit 7 detects the voltage Vb of the detection resistor 14 and also controls the output current so that the output current becomes a current value responsive to the electric signal indicated by ES110 in FIG. 1 based on the voltage Vb.

Thus, the current control circuit 7 controls the output current based on the voltage Vb of the detection resistor 14, whereby it is made possible to control the output current so that the output current becomes the current value responsive to the electric signal indicated by ES110 in FIG. 1.

Consequently, as for the operation concerning power supply of the two-wire transmitter according to the invention, the computation control section outputs an electric signal responsive to the measurement value of the sensor to the current control circuit, the current control circuit controls the output current so that the output current becomes the current value responsive to the electric signal, and if current consumption becomes smaller than the output current, the surplus current flows into the capacitor, which then is charged, whereby it is made possible to receive power supply from the external circuit through the two transmission lines and also transmit a current signal of 4 to 20 mA.

Next, an operation sequence of the two-wire transmitter when the maximum current consumption temporarily exceeds the output current will be discussed.

The computation control section 11 of the two-wire transmitter has a characteristic of determining current consumption according to the frequency of the clock signal supplied from the clock supply circuit 12.

The two-wire transmitter involves a time period over which a higher processing capability temporarily becomes necessary in response to the processing to be executed and a time period over which a higher processing capability is not necessary as temporarily the processing to be executed does not exist and an idle mode is entered. In other words, the two-wire transmitter does not always require the same processing capability.

The computation control section 11 previously finds processing information concerning the computation processing amount in a time period over which a high processing capability is required and the computation processing amount is large in complicated computation processing, etc., a time period over which complicated computation processing is not performed and the computation processing amount is small, or the like and the time period, which will be hereinafter referred to as computation processing information.

The computation control section 11 performs computation processing, etc., based on software operated in accordance with such previously found computation processing information.

Therefore, the computation control section 11 outputs a setting signal to the clock supply circuit 12 for controlling the frequency of the clock signal based on the previously found computation processing information, whereby it is made possible to control the current consumption of the two-wire transmitter 110.

Figure 2:
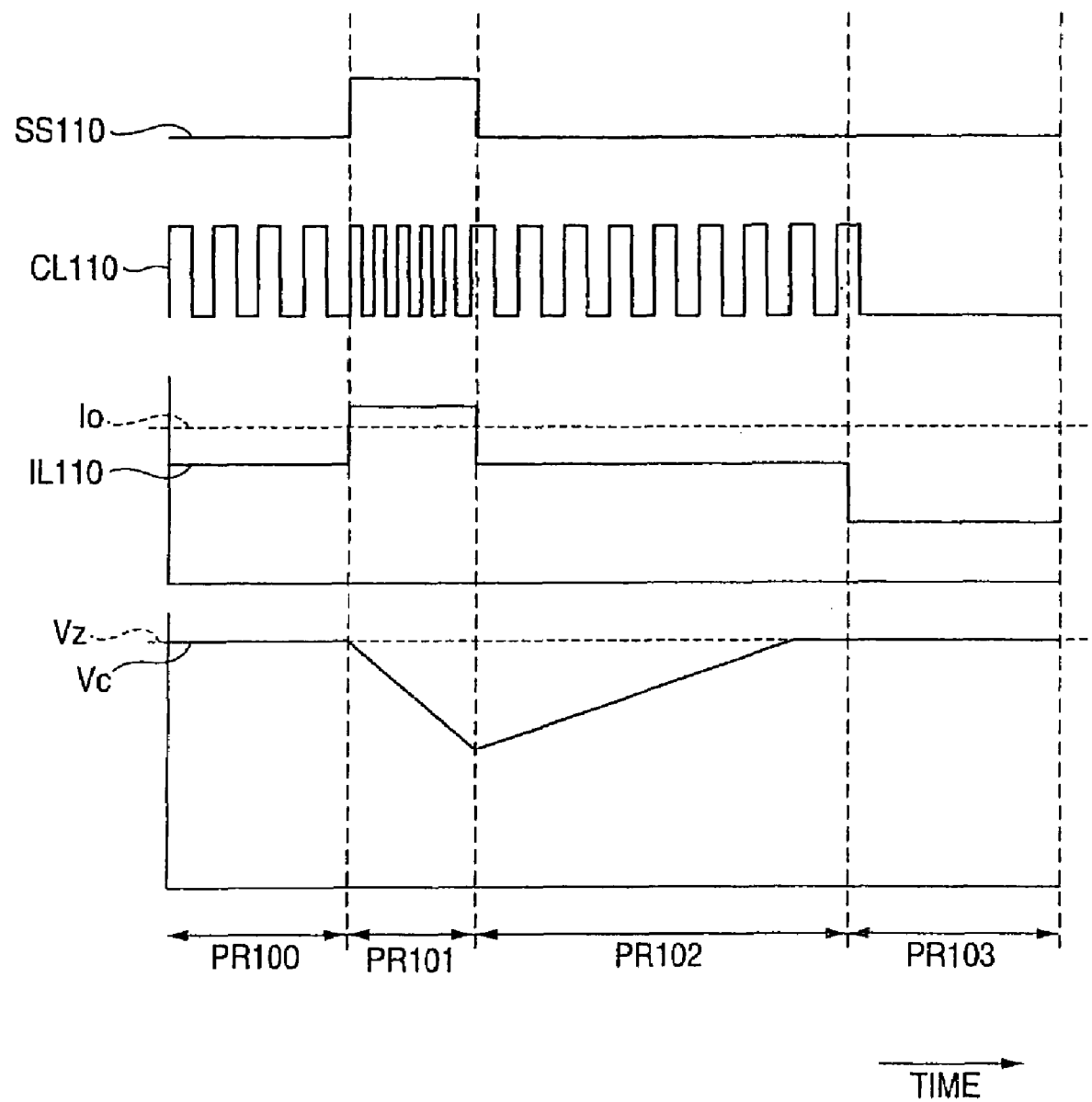
FIG. 2 is a timing chart to describe the operation of the two-wire transmitter in FIG. 1.

Such an operation sequence of the two-wire transmitter 110 in FIG. 1 when the maximum current consumption temporarily exceeds the output current will be discussed with FIG. 2. FIG. 2 is a timing chart to describe the operation of the two-wire transmitter in FIG. 1. For simplicity of the description, it is assumed that the two-wire transmitter in FIG. 1 is designed so that as the processing capability of the computation control section 11 becomes high, the current consumption becomes larger than the output current.

The clock supply circuit 12 supplies a clock signal at a predetermined frequency (standard frequency) to the computation control section 11 in a time period over which a high computation processing capability is not required based on the previously found computation processing information.

For example, as shown in FIG. 2, the clock supply circuit 12 supplies a clock signal indicated by CL110 in FIG. 2 at a predetermined frequency (standard frequency) to the computation control section 11 in a time period indicated by PR100 in FIG. 2.

The computation control section 11 outputs a setting signal for increasing the frequency of the clock signal to the clock supply circuit 12 in a time period over which the computation processing amount is large based on the previously found computation processing information.

For example, it is assumed that a high processing capability is required for the computation control section 11 in complicated computation processing, etc., and a large computation processing amount is required in a time period indicated by PR101 in FIG. 2.

The computation control section 11 outputs a setting signal indicated by SS110 in FIG. 1 to the clock supply circuit 12 in the time period indicated by PR101 in FIG. 2 based on the previously found computation processing information.

The clock supply circuit 12 supplies a high-frequency clock signal indicated by CL110 in FIG. 1 to the computation control section 11 based on the setting signal indicated by SS110 in FIG. 1.

Thus, the high-frequency clock signal is supplied from the clock supply circuit 12, whereby the processing capability of the computation control section 11 becomes high and the current consumption of the computation control section 11 grows.

In this case, since the two-wire transmitter is designed so that as the processing capability of the computation control section 11 becomes high, the current consumption becomes larger than the output current, the current consumption of the computation control section 11 becomes larger than the output current of the two-wire transmitter 110 and the current required for the operation of the two-wire transmitter 110 is insufficient.

For example, the processing capability of the computation control section 11 becomes high in the time period indicated by PR101 in FIG. 2, whereby current consumption indicated by IL110 in FIG. 2 becomes larger than output current indicated by Io in FIG. 2 and the current required for the operation of the two-wire transmitter 110 is insufficient.

In such a case, when the current required for the operation of the two-wire transmitter 110 is insufficient, the capacitor 8 is discharged for compensating for the insufficient current, so that it is made possible for the two-wire transmitter 110 to operate if the maximum current consumption temporarily exceeds the output current. Since voltage is discharged from the capacitor 8, the voltage Vc decreases.

The computation control section 11 stops outputting the setting signal indicated by SS110 in FIG. 1 in a time period over which the computation processing amount is small based on the previously found computation processing information.

For example, it is assumed that the computation control section 11 does not perform complicated computation processing and the computation processing amount is small in a time period indicated by PR102 in FIG. 2.

The computation control section 11 stops outputting the setting signal indicated by SS110 in FIG. 1 in the time period indicated by PR102 in FIG. 2 based on the previously found computation processing information.

The clock supply circuit 12 restores the frequency of the clock signal to the predetermined frequency (standard frequency) and outputs the clock signal to the computation control section 11.

Thus, the clock signal at the predetermined standard frequency is supplied from the clock supply circuit 12, whereby the processing capability of the computation control section 11 decreases to the standard processing capability and the current consumption of the computation control section 11 decreases.

The processing capability of the computation control section 11 is restored to the standard processing capability, whereby the current consumption of the computation control section 11 decreases and becomes smaller than the output current of the two-wire transmitter 110. In this case, a surplus current occurs in the two-wire transmitter 110.

For example, the processing capability of the computation control section 11 is restored to the standard processing capability in the time period indicated by PR102 in FIG. 2 and the current consumption indicated by IL100 in FIG. 2 decreases and becomes smaller than the output current indicated by Io in FIG. 2, whereby a surplus current occurs in the two-wire transmitter 110.

If such a surplus current occurs, the surplus current flows into the capacitor 8, which then is charged, so that the voltage Vc increases.

Thus, the computation control section 11 controls the clock signal of the clock supply circuit 12 based on the previously found computation processing information, whereby it is made possible for the two-wire transmitter 110 to operate if the maximum current consumption temporarily exceeds the output current.

Consequently, as for the operation of the two-wire transmitter when the maximum current consumption temporarily exceeds the output current, the computation control section outputs a setting signal to the clock supply circuit based on the previously found computation processing information, the clock supply circuit temporarily increases the frequency of the clock signal based on the setting signal, and if the current consumption becomes larger than the output current, the capacitor is discharged for compensating for the insufficient current, so that it is made possible for the two-wire transmitter to operate if the maximum current consumption temporarily exceeds the output current.

The computation control section controls the clock signal of the clock supply circuit based on the previously found computation processing information and if the current consumption becomes larger than the output current, the capacitor is discharged, whereby the two-wire transmitter operates if the maximum current consumption temporarily exceeds the output current, so that it is made possible to improve the computation processing performance of the computation processing speed, the response speed, etc., of the computation control section.

In the embodiment shown in FIG. 1, etc., the computation control section 11 outputs the setting signal for controlling the frequency of the clock signal by way of example, but the embodiment is not limited to the mode. The computation control section may be able to stop the operation in a time period over which computation processing of the computation control section is not required.

The case where the computation control section of the embodiment of the two-wire transmitter according to the invention will be discussed.

For example, it is assumed that computation processing of the computation control section 11 is not required in a time period indicated by PR103 in FIG. 2.

In this case, the computation control section 11 stops the operation of computation processing, etc., in the time period indicated by PR103 in FIG. 2 based on the previously found computation processing information. In other words, the computation control section 11 enters an idle state.

Thus, the operation of the computation control section 11 stops in the time period indicated by PR103 in FIG. 2, whereby the current consumed by the computation control section 11 decreases and current consumption indicated by IL110 in FIG. 1 decreases.

Consequently, the computation control section stops the operation based on the previously found computation processing information, whereby it is made possible to decrease the average current consumption.

In the embodiment shown in FIG. 1, etc., if the current consumption becomes larger than the output current, the capacitor 8 is discharged, thereby compensating for the insufficient current by way of example. However, a voltage detection section capable of detecting overdischarge of the capacitor may be added to the two-wire transmitter 110.

For example, in the embodiment shown in FIG. 1, etc., the capacitor 8 may be excessively discharged to such an extent that the voltage charged in the capacitor 8 becomes lower than the voltage at which the two-wire transmitter 110 can operate because of a malfunction of software of the computation control section 11 or the like.

Figure 3:
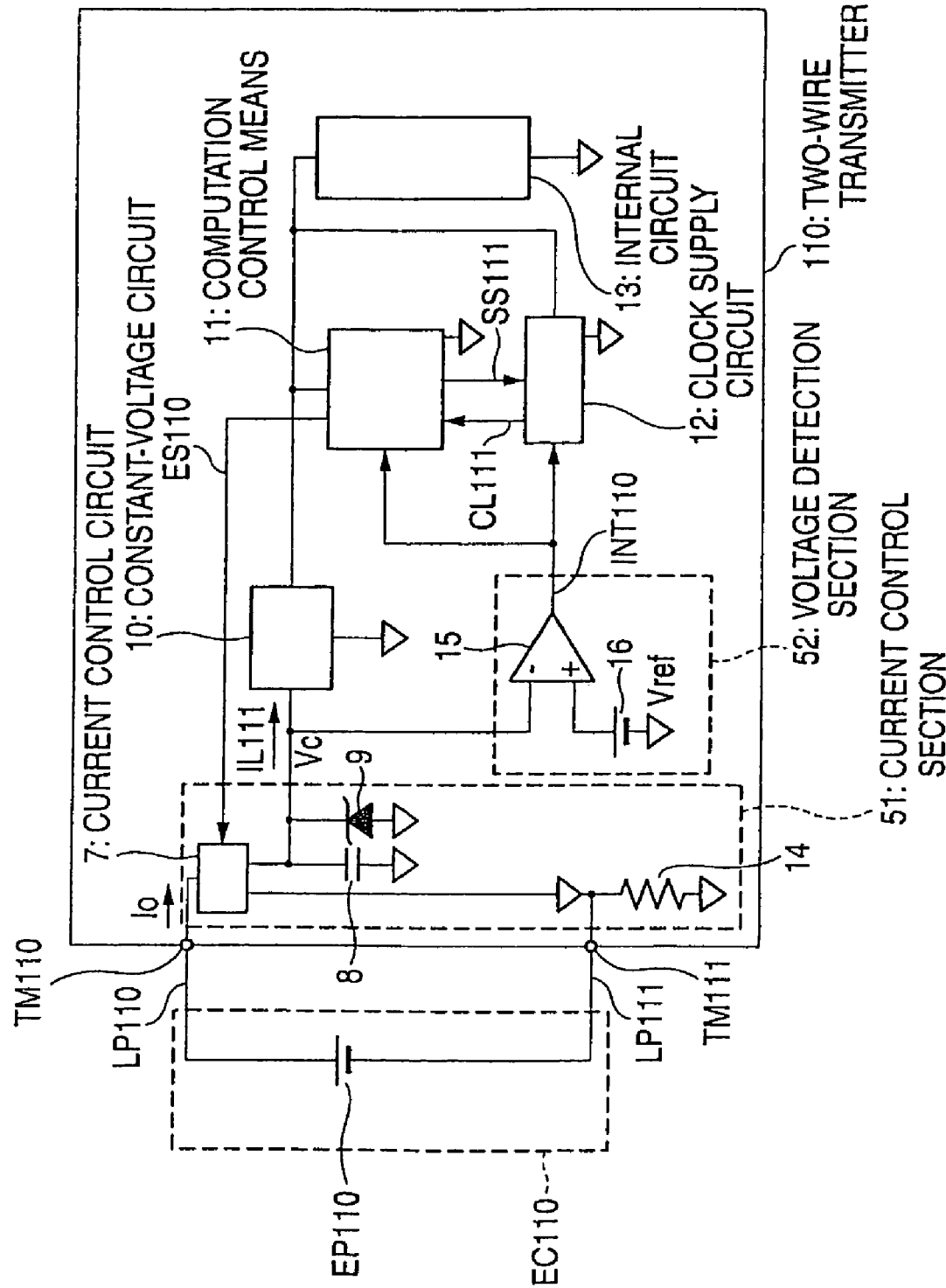
FIG. 3 is a block diagram to show the embodiment of a two-wire transmitter according to the invention.

In this case, an embodiment of a two-wire transmitter of the invention intended for detecting overdischarge of a capacitor and recovering the capacitor to the normal state will be discussed with the accompanying drawing. FIG. 3 is a block diagram to show the embodiment of the two-wire transmitter according to the invention.

In FIG. 3, numeral 15 denotes a hysteresis comparator having a predetermined hysteresis width (hereinafter, simply called comparator) and numeral 16 denotes a constant voltage source. Components 7, 8, 9, 10, 11, 12, 13, 14, and 51 in FIG. 3 are identical with those in FIG. 1. The configuration in FIG. 3 is the same as that in FIG. 1 except voltage detection section and therefore will not be discussed again where appropriate. The comparator 15 and the constant voltage source 16 make up a voltage detection section 52.

An opposite end of a current control circuit 7 is connected to an inversion input terminal of the comparator 15. Although not shown in the figure, a reference voltage indicated by Vref in FIG. 3 output from the constant voltage source 16 is divided into two voltages by a plurality of resistors (not shown) and the voltages are applied to non-inversion input terminals of the comparator 15.

An output terminal of the comparator 15 is connected to an interrupt terminal of computation control section 11 and an interrupt terminal of a clock supply circuit 12.

The reference voltage indicated by Vref in FIG. 3 is divided by a plurality of resistors (not shown), etc., and the voltages are applied to the non-inversion input terminals of the comparator 15, whereby a first comparison voltage VTL and a second comparison voltage VTH are defined in the comparator 15. The first comparison voltage VTL is smaller than the second comparison voltage VTH.

Figure 4:
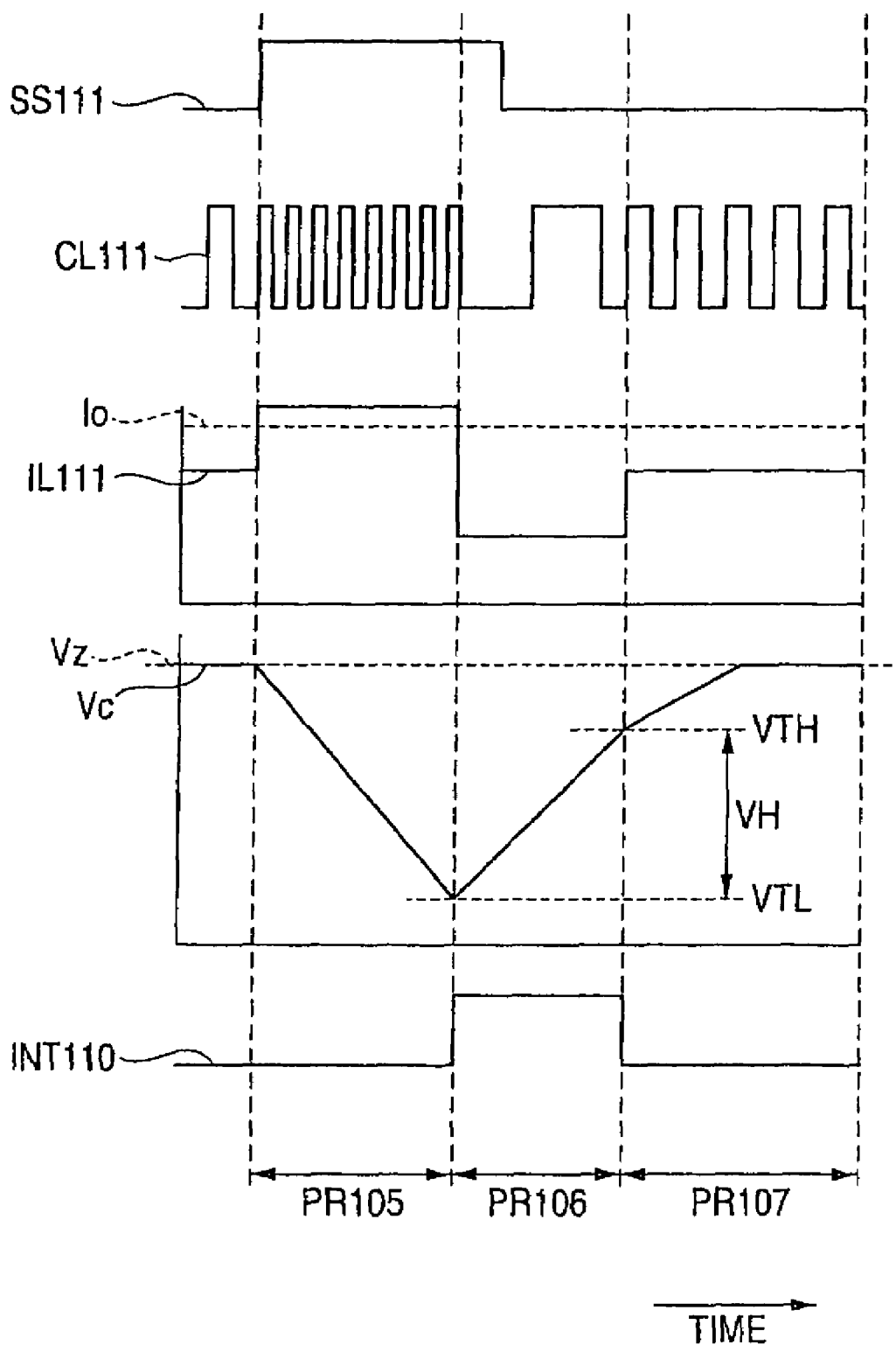
FIG. 4 is a timing chart to describe the operation of the two-wire transmitter in FIG. 3.

The operation of the embodiment of the two-wire transmitter according to the invention shown in FIG. 3 for detecting overdischarge of a capacitor will be discussed with FIG. 4. FIG. 4 is a timing chart to describe the operation of the two-wire transmitter in FIG. 3.

In the computation control section 11, the processing capability may temporarily become high and current consumption may become larger than output current because of a load current increase, a malfunction, etc., of the internal circuitry of the two-wire transmitter.

For example, it is assumed that the computation control section 11 continues unnecessarily in a state in which a high processing capability is required in complicated computation processing, etc., because of a malfunction of software of the computation control section 11, an increase in current consumption of internal circuitry 13, or the like in a time period indicated by PR105 in FIG. 4.

In this case, the computation control section 11 outputs a setting signal indicated by SS111 in FIG. 3 to the clock supply circuit 12 in a time period indicated by PR105 in FIG. 4 based on computation processing information.

The clock supply circuit 12 increase the frequency of a clock signal based on the setting signal indicated by SS111 in FIG. 3 and supplies a clock signal indicated by CL111 in FIG. 3 to the computation control section 11.

Thus, the high-frequency clock signal is supplied from the clock supply circuit 12, whereby the processing capability of the computation control section 11 becomes high and the current consumption of the computation control section 11 grows.

The current consumption becomes larger than the output current and the current required for the operation of the two-wire transmitter 110 is insufficient.

For example, the processing capability of the computation control section 11 becomes high in the time period indicated by PR105 in FIG. 4, whereby current consumption indicated by IL111 in FIG. 4 becomes larger than output current indicated by Io in FIG. 4 and the current required for the operation of the two-wire transmitter 110 is insufficient.

If the current required for the operation of the two-wire transmitter 110 is thus insufficient, a capacitor 8 is discharged for compensating for the shortage of the current. Since the capacitor 8 is discharged, the voltage Vc decreases.

The comparator 15 makes a comparison between the voltage Vc and the first comparison voltage indicated by VTL in FIG. 4 and between the voltage Vc and the second comparison voltage indicated by VTH in FIG. 4.

If the voltage Vc becomes smaller than the first comparison voltage indicated by VTL in FIG. 4, the comparator 15 outputs high (H); if the voltage Vc becomes larger than the second comparison voltage indicated by VTH in FIG. 4, the comparator 15 outputs low (L).

For example, if the voltage Vc becomes smaller than the first comparison voltage indicated by VTL in FIG. 4 in the time period indicated by PR105 in FIG. 4, the comparator 15 outputs a high voltage to the computation control section 11 and the clock supply circuit 12.

If the comparator 15 outputs high, each of the computation control section 11 and the clock supply circuit 12 recognizes that an interrupt signal indicated by INT110 in FIG. 3 is input.

In a time period indicated by PR106 in FIG. 4, the computation control section 11 restores the clock setting signal indicated by SS111 in FIG. 3 to the standard state based on the interrupt signal indicated by INT110 in FIG. 3 for decreasing the current consumption and executes error notification processing concerning event occurrence of overdischarge while recovering to the normal operation.

The clock supply circuit 12 sets the frequency of the clock signal indicated by CL111 in FIG. 3 lower than a predetermined frequency (standard frequency) based on the interrupt signal indicated by INT110 in FIG. 3 and outputs the clock signal to the computation control section 11.

Thus, the low-frequency clock signal is supplied from the clock supply circuit 12, whereby the processing capability of the computation control section 11 becomes low and the current consumption of the computation control section 11 decreases.

As the processing capability of the computation control section 11 becomes low, the current consumption decreases and becomes smaller than the output current. In this case, a surplus current occurs in the two-wire transmitter 110.

For example, in the time period indicated by PR106 in FIG. 4, the processing capability of the computation control section 11 becomes low, whereby the current consumption indicated by IL111 in FIG. 4 decreases and becomes smaller than the output current indicated by Io in FIG. 4 and a surplus current occurs in the two-wire transmitter 110.

If such a surplus current occurs, the surplus current flows into the capacitor 8, which then is charged, so that the voltage Vc increases.

The comparator 15 outputs high until the voltage Vc increases and becomes larger than the second comparison voltage indicated by VTH in FIG. 4.

If the voltage Vc increases and becomes larger than the second comparison voltage indicated by VTH in FIG. 4 in a time period indicated by PR107 in FIG. 4, the comparator 15 outputs low.

Thus, once the voltage Vc becomes smaller than the first comparison voltage indicated by VTL in FIG. 4 and the comparator 15 outputs high, the output of the comparator 15 remains high and does not switch low until the voltage Vc becomes larger than the second comparison voltage indicated by VTH in FIG. 4.

That is, it is made possible for the comparator 15 having hysteresis to maintain output high until the voltage Vc sufficiently recovers.

If the comparator 15 outputs low, each of the computation control section 11 and the clock supply circuit 12 recognizes that input of the interrupt signal indicated by INT110 in FIG. 3 stops.

The computation control section 11 outputs a setting signal indicated by SS111 in FIG. 4 to the clock supply circuit 12 based on stop of input of the interrupt signal indicated by INT110 in FIG. 3 in the time period indicated by PR107 in FIG. 4.

The clock supply circuit 12 restores the frequency of the clock signal to the predetermined frequency (standard frequency) based on the setting signal indicated by SS111 in FIG. 4 and outputs the clock signal indicated by CL111 in FIG. 3 to the computation control section 11.

Thus, the clock signal of the predetermined frequency is supplied from the clock supply circuit 12, whereby the computation control section 11 is restored to the standard processing capability and the current consumption of the computation control section 11 is restored to the standard current consumption value.

The current consumption becomes smaller than the output current, whereby the surplus current flows into the capacitor 8, which then is charged, and the voltage Vc increases.

The voltage "Vc" is clamped to Zener voltage Vz preset by a Zener diode 9. That is, the voltage "Vc" does not become higher than the Zener voltage Vz.

Consequently, if the output voltage of the current control section becomes smaller than the first comparison voltage of the voltage detection section, the voltage detection section outputs an interrupt signal, the computation control section stops outputting the setting signal, the clock supply circuit temporarily decreases the frequency of the clock signal and if the voltage of the current control section becomes larger than the second comparison voltage of the voltage detection section, the voltage detection section stops outputting the interrupt signal and the clock supply circuit restores the clock signal to the standard frequency, whereby it is made possible to detect overdischarge of the capacitor and recover the capacitor to the normal state.

Once the input voltage becomes smaller than the first comparison voltage and the comparator 15 having hysteresis outputs high, the output of the comparator 15 does not switch low until the output voltage of the current control section becomes larger than the second comparison voltage, so that it is made possible to maintain output of the comparator high until the voltage Vc sufficiently recovers.

In the embodiment shown in FIG. 1, etc., the computation control section 11 restores the clock setting signal indicated by SS111 in FIG. 3 to the standard state based on the interrupt signal indicated by INT110 in FIG. 3 for decreasing the current consumption and executes error notification processing concerning event occurrence of overdischarge while recovering to the normal operation by way of example. However, the invention is not limited to the mode. The computation control section 11 may stop outputting the setting signal indicated by SS111 in FIG. 3 to the clock supply circuit 12 based on the interrupt signal indicated by INT110 in FIG. 3.

In the embodiment shown in FIG. 1, etc., the voltage of the two-wire transmitter is clamped to the Zener voltage Vz by the Zener diode 9 by way of example. However, the invention is not limited to the mode and a shut regulator circuit may be used.

In the embodiment shown in FIG. 1, etc., the current control circuit 7 controls the current based on the detection voltage occurring in the detection resistor 14 by way of example. However, the invention is not limited to the mode and any configuration may be adopted if the current control circuit can keep the output current to the current value based on the measurement value of the sensor.

In the embodiment shown in FIG. 1, etc., the analog transmitter is illustrated as the two-wire transmitter. However, the invention is not limited to it. The invention may be applied to a digital bus transmitter if the transmitter can operate if the maximum current consumption temporarily exceeds output current.

In the embodiment shown in FIG. 1, etc., the comparator 15 having hysteresis detects overdischarge of the capacitor 8 and outputs high until the output voltage of the current control section 51, Vc, becomes larger than the second comparison voltage if the output voltage Vc becomes smaller than the first comparison voltage; the comparator 15 outputs low if the output voltage Vc becomes larger than the second comparison voltage by way of example. However, the invention is not limited to the mode and a comparator having no hysteresis may be adopted.

In the embodiment shown in FIG. 1, etc., the computation control section 11 stops outputting the setting signal indicated by SS110 in FIG. 3 based on the interrupt signal indicated by INT110 in FIG. 3 by way of example. However, the invention is not limited to the mode. The computation control section may output a setting signal based on an interrupt signal and the clock supply circuit may supply a low-frequency clock signal to the computation control section based on the setting signal.

In the embodiment shown in FIG. 1, etc., the computation control section 11 stops outputting the setting signal indicated by SS110 in FIG. 3 based on the interrupt signal indicated by INT110 in FIG. 3 and the clock supply circuit 12 supplies a low-frequency clock signal to the computation control section 11 by way of example. However, the invention is not limited to the mode. The clock supply circuit may lower the frequency of the clock signal based on an interrupt signal of the voltage detection section regardless of the setting signal from the computation control section.

In the embodiment shown in FIG. 1, etc., if the comparator 15 outputs high, each of the computation control section 11 and the clock supply circuit 12 recognizes that the interrupt signal indicated by INT110 in FIG. 3 is input; if the comparator 15 outputs low, each of the computation control section 11 and the clock supply circuit 12 recognizes that input of the interrupt signal indicated by INT110 in FIG. 3 stops by way of example. However, the invention is not limited to the mode. The computation control section 11 and the clock supply circuit 12 may recognize that the interrupt signal is input if the comparator 15 outputs low; the computation control section 11 and the clock supply circuit 12 may recognize that input of the interrupt signal stops if the comparator 15 outputs high.

In the embodiment shown in FIG. 1, etc., if the output voltage Vc of the current control section 51 becomes smaller than the first comparison voltage indicated by VTL in FIG. 4, the voltage detection section 52 outputs the interrupt signal indicated by INT110 in FIG. 4 to the clock supply circuit 12 for temporarily decreasing the frequency of the clock signal by way of example. However, the invention is not limited to the mode. If the output voltage of the current control section becomes smaller than the first comparison voltage, the voltage detection section may output an interrupt signal to the clock supply circuit for restoring the frequency of the clock signal to the standard frequency.

DRAWINGS

FIG. 1
7: CURRENT CONTROL CIRCUIT
10: CONSTANT-VOLTAGE CIRCUIT
11: COMPUTATION CONTROL MEANS
12: CLOCK SUPPLY CIRCUIT
13: INTERNAL CIRCUIT
51: CURRENT CONTROL SECTION
110: TWO-WIRE TRANSMITTER

FIG. 3
7: CURRENT CONTROL CIRCUIT
10: CONSTANT-VOLTAGE CIRCUIT
11: COMPUTATION CONTROL MEANS
12: CLOCK SUPPLY CIRCUIT
13: INTERNAL CIRCUIT
51: CURRENT CONTROL SECTION
52: VOLTAGE DETECTION SECTION
110: TWO-WIRE TRANSMITTER

Figure 5:
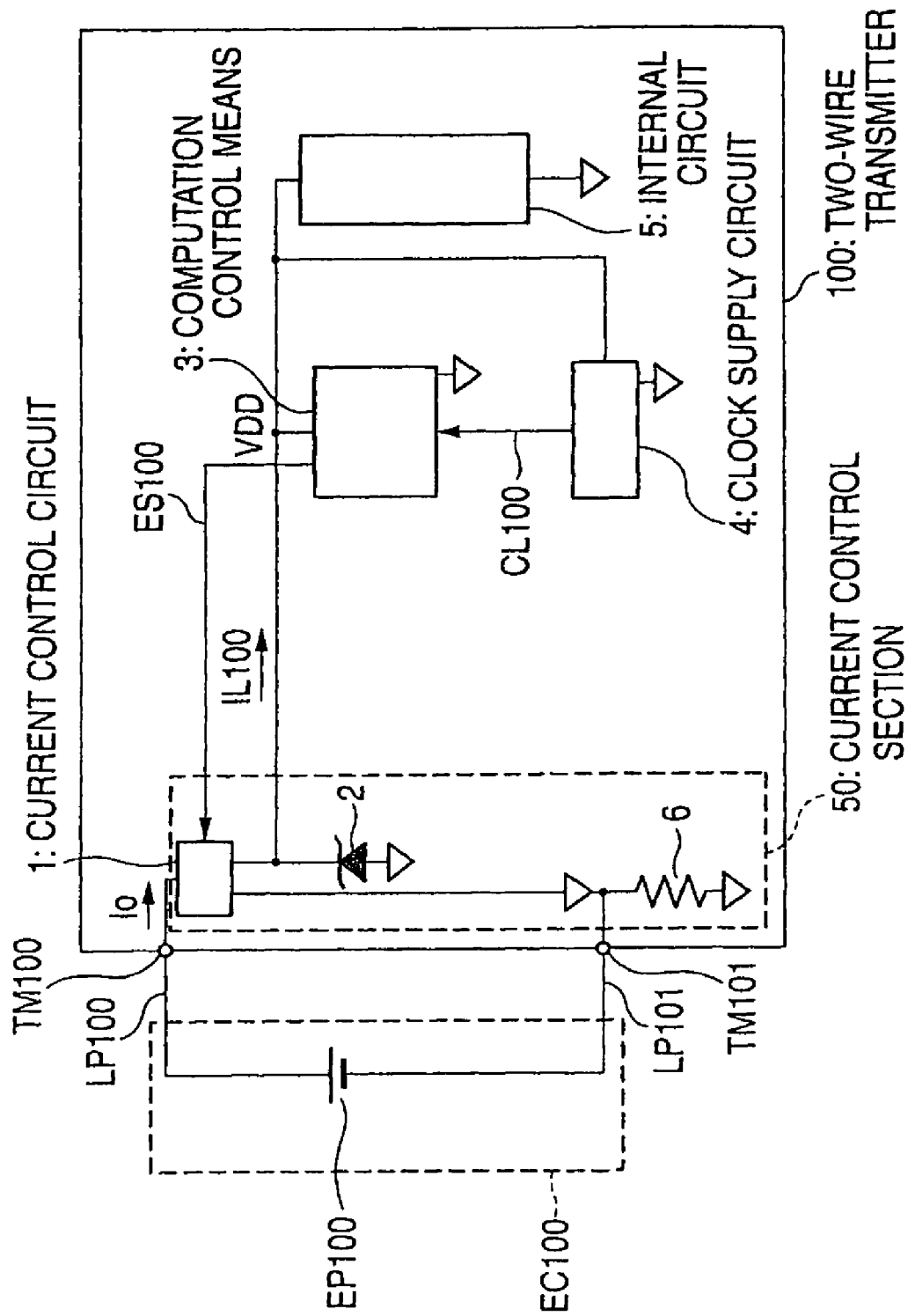
FIG. 5 is a block diagram to show an example of a two-wire transmitter in a related art.

FIG. 5
1: CURRENT CONTROL CIRCUIT
3: COMPUTATION CONTROL MEANS
4: CLOCK SUPPLY CIRCUIT
5: INTERNAL CIRCUIT
50: CURRENT CONTROL SECTION
100: TWO-WIRE TRANSMITTER

What is claimed is:

1. A two-wire transmitter for receiving power supply from an external circuit through two transmission lines and also transmitting a current signal based on a measurement value of a sensor, said two-wire transmitter comprising:
a current control section to which a voltage is supplied from the external circuit, for controlling a current value of the current signal based on an electric signal responsive to the measurement value of the sensor, if current consumption of said two-wire transmitter becomes smaller than the current value of the current signal, said current control section for charging and if the current consumption becomes larger than the current value of the current signal, said current control section for discharging;
a computation control section for outputting the electric signal to said current control section and also outputting a setting signal based on predetermined computation processing information;
a clock supply circuit for controlling a frequency of a clock signal based on the setting signal and supplying the clock signal to said computation control section; and
a constant-voltage circuit for setting output voltage of said current control section to a predetermined voltage and supplying the voltage at least to said computation control section and said clock supply circuit.

2. The two-wire transmitter as claimed in claim 1, further comprising:
a voltage detection section for outputting an interrupt signal if output voltage of said current control section reaches a preset comparison voltage,
wherein said computation control section stops outputting the setting signal if the interrupt signal is input.

3. The two-wire transmitter as claimed in claim 1, further comprising:
a voltage detection section for outputting an interrupt signal if output voltage of said current control section reaches a preset comparison voltage,
wherein said clock supply circuit lowers the frequency of the clock signal if the interrupt signal is input.

4. The two-wire transmitter as claimed in claim 1 wherein said current control section includes:
a detection resistor having one end connected to a power unit of the external circuit through the transmission line and an opposite end grounded for converting the current signal into a voltage;
a current control circuit for controlling the current value of the current signal based on the voltage detected by the detection resistor and the electric signal;
a capacitor having one end connected to the current control circuit and an opposite end grounded, if the current consumption becomes smaller than the current value of the current signal, the capacitor being charged and if the current consumption becomes larger than the current value of the current signal, the capacitor being discharged; and
a Zener diode having one end connected to the current control circuit and an opposite end grounded for clamping voltage of the capacitor to a preset voltage.

5. The two-wire transmitter as claimed in claim 1 wherein said computation control section stops an operation based on the predetermined computation processing information.

6. The two-wire transmitter as claimed in claim 2 wherein said voltage detection section includes a comparator for outputting the interrupt signal if the output voltage of said current control section reaches a comparison voltage.

7. The two-wire transmitter as claimed in claim 3 wherein said voltage detection section includes a comparator for outputting the interrupt signal if the output voltage of said current control section reaches a comparison voltage.

8. The two-wire transmitter as claimed in claim 2 wherein said voltage detection section makes a comparison between the output voltage of said current control section and a first comparison voltage and between the output voltage and a second comparison voltage higher than the first comparison voltage and outputs the interrupt signal to said computation control section or said clock supply circuit based on a comparison result.

9. The two-wire transmitter as claimed in claim 3 wherein said voltage detection section makes a comparison between the output voltage of said current control section and a first comparison voltage and between the output voltage and a second comparison voltage higher than the first comparison voltage and outputs the interrupt signal to said computation control section or said clock supply circuit based on a comparison result.

10. The two-wire transmitter as claimed in claim 8 wherein said voltage detection section includes a comparator having hysteresis for outputting the interrupt signal until the output voltage of said current control section is restored to the second comparison voltage if the output voltage of said current control section reaches the first comparison voltage.

11. The two-wire transmitter as claimed in claim 9 wherein said voltage detection section includes a comparator having hysteresis for outputting the interrupt signal until the output voltage of said current control section is restored to the second comparison voltage if the output voltage of said current control section reaches the first comparison voltage.

* * * * *